Patented June 6, 1944

2,350,366

UNITED STATES PATENT OFFICE 2,350,366

MOISTURE-RESISTANT CELLOPHANE

James A. Mitchell, Kenmore, N. Y., assignor to E. I. du Pont de Nemours & Company, Wilmington, Del., a corporation of Delaware No Drawing. Application March 28, 1942, Serial No. 436,719

5 Claims. (Cl. 117—145)

This invention relates to moisture-resistant sheet wrapping material, especially transparent moisture-proofed non-fibrous sheet. More particularly it appertains to non-tacky age-resistant heat-sealable moistureproofing coatings on films of regenerated cellulose and the like.

One of the newer sheet wrapping materials consists of a thin, cellulosic base sheet having a moistureproofing coating. The manufacture of typical base sheet (film, foil, pellicle, skin, tissue, web) is described in U. S. A. Patents 1,548,864 (Brandenberger) and 2,123,883 (Ellsworth). Representative coating compositions and the application thereof are set out in U. S. A. Patents 1,737,187 (Charch and Prindle), 1,826,697-8 (Charch and Craigue), 2,042,589 (Charch and Hershberger), 2,147,180 (Ubben), 2,159,151 (Hershberger), 2,169,366 (Meigs) and 2,201,747 (Staudt).

The coating is usually a continuous, unbroken layer comprising essentially moistureproofing material (material which does not dissolve more than an infinitesimal amount of, if any in water), for example, a waxy (wax-like) substance such as paraffin wax, and a cementing (binding, filmforming) material therefor, for example, cellulose nitrate.

To improve the properties, inter alia, flexibility, of the coating, plasticizing material, for example dibutyl phthalate, is generally incorporated therein. The base sheet as produced usually contains softening material, for example glycerol, and has, therefore, adequate pliability.

To overcome any haziness which might result from some proportions and combinations of other components of the coating, transparentizing (blending, homogenizing) material, for example, resins and gums such as damar and ester gum, is ordinarily included.

The present state of the moistureproofing art, to which reference is made for conventional details in the interest of brevity, is indicated by U. S. A. patents: Nos. 1,826,696 (Charch and Prindle), 1,962,338 (Charch), 1,972,869 (Charch, Hyden and Siemann), 1,989,681 (Charch), 1,990,080 (Leach and Siemann), 1,997,583 (Hitt), 1,997,857 (Charch), 2,022,490 (Charch), 2,030,962 (Charch, Hyden and Siemann), 2,042,638 (Siemann), 2,061,374 (Charch), 2,064,292 (Charch), 2,065,792 (Charch), 2,077,396 (Charch and Hershberger), 2,077,399 (Collins and Larson), 2,077,400 (Collins), 2,079,379 (Mitchell), 2,079,395 (Bradshaw), 2,085,816 (Meigs), 2,087,013 (Bateman), 2,094,771 (Charch and Hershberger), 2,096,122 (Maney), 2,098,534-542 (Charch, Brubaker and Meigs), 2,100,377 (Brubaker), 2,122,418 (Gladding and Maney), 2,122,433 (Meigs), 2,137,636 (Barrett), 2,144,383 (Meigs), 2,147,628 (Charch), 2,147,629 (Charch), 2,159,007 (Charch and Bateman), 2,177,645 (Flint and Mitchell), 2,192,314 (Izard and Mitchell), 2,193,831 (Mitchell), 2,205,210 (Latour), 2,205,428 (Mitchell), 2,209,965 (Finzel), 2,213,252 (Mitchell), 2,216,812 (Flint), and 2,234,565 (Lanning).

In spite of the many desirable properties of ordinary moistureproof transparent regenerated cellulose film, its usefulness in some fields, for example, where heat sealing is required, is severely circumscribed. Sealing package wrappers by means of heat and pressure is one of the commonest and simplest methods known and employed, and it will be obvious, therefore, that a wrapping material not capable of being so sealed is at a considerable disadvantage. Extensive research has been and is being carried out, with the object of improving the heat sealing characteristics of moistureproof transparent sheet.

Hershberger (U. S. A. patent application Serial No. 749,615, filed October 23, 1934) has proposed that cyclized rubber be employed as the cementing agent in this type of coating in order to produce better heat seals. The seals are initially very good, but they weaken rapidly and their deterioration is generally so complete that the package wrapper loosens and moisture gains access to the package contents through the section of the wrapper embodying the seal. In addition, the cyclized rubber discolors rapidly, particularly when subjected to sunlight or heat, to such an extent that the resultant discoloration of the package wrapper suggests to the consumer that foodstuffs and related materials so wrapped are not in the best of condition.

The primary object of this invention was to provide improved moistureproofing and moisture-resisting coatings for Cellophane (regenerated cellulose sheet). Other objects were to improve heat sealable moistureproofing coatings, to lengthen the life of heat sealable coatings containing cyclized rubber, to stabilize cyclized rubber against deterioration from age, to prevent the formation of color in moistureproofing coatings and the like containing cyclized rubber, and to devise heat sealing processes and compositions which would give heat seals having a long life. A general advance in the art, and other objects which will appear hereinafter, are also contemplated.

It has now been found that the useful life of heat seals embodying moistureproofing coatings containing cyclized rubber as the cementing agent, can be greatly lengthened and stabilized, and color formation in moisture-resistant coatings containing cyclized rubber can be restrained (arrested, avoided, eliminated, prevented, inhibited, curbed, repressed, obviated) by diluting (compounding with, incorporating therein) them with certain amino polymers. These polymeric amino substances are mostly synthetic resins derived from ammonia and/or monomeric amino-hydrogen-containing bodies which are capable of being formed into coherent (self-sustaining) films, and which are substantially insoluble in water and soluble in 2% aqueous acetic acid and organic solvents. They are, with few exceptions, substantially insoluble in 5% aqueous ammonia or sodium hydroxide. The amino nitrogen may be primary, secondary or tertiary, and may be part of an open chain or of a cyclic molecular structure.

Cyclized rubber with a softening point near the lower end of the range 30° to 105° C. are in general preferred. A product with a softening point around 30° C. is ordinarily employed. Obviously, the most satisfactory softening point depends upon the particular use to which the material is to be put. Although the 30° C. softening material was employed in many of the specific examples, it is to be understood that any one or a plurality of the products may be employed, when desired.

So far as is known, no organic polymeric basic material of this type has been suggested before for the present purpose. In addition to arresting the deterioration of the cyclized rubber system or composition, amino polymers of this class have the additional advantage of adding to the film-forming (the capability of being formed into a coherent, solid film, dry to the touch) and plastic characteristics of the composition in question.

How the foregoing objects and related ends are accomplished will be apparent from the following exposition, in which are disclosed the principle and divers embodiments of the invention, including the best mode contemplated for carrying out the same. The parts are given by weight throughout the application unless otherwise specified.

Comparative heat seal strengths appear to be the most satisfactory way of showing the effectiveness (stabilizing effect) of the amino polymers in cyclized rubber. A standard heat seal strength test (see U. S. A. Patent No. 2,147,180 to Ubben) was used to secure the data in the tables of representative results and examples which follow. In this test two strips of the coated material (in this case regenerated cellulose sheeting) 1.5 inches wide are superimposed one on the other so that opposite faces of the material are in contact. A seal is made across the width of the material at one end by placing the material on a metal plate heated to 130° C., and rolling thereover a roller ⅝ inch wide weighted to 650 grams. The two strips so sealed are separated at the end where they are unsealed and placed in a stretching device such as a Suter testing machine. By gripping the free ends of the strips in suitable clamps, one of which is fixed while the other is moved away at a constant speed of 12 inches per minute, and measuring the force applied, the desired data is obtained. The force in grams required to pull the sheets apart is taken as a measure of the heat seal bond strength.

Table I

| Per cent | Amino polymer stabilizer | Heat seal strength | | | |
|---|---|---|---|---|---|
| | | Original | 7 days | 14 days | 21 days |
| | None (control) | 700 | 10 | 10 | 10 |
| 1 | Dimethyl amino ethyl methacrylate polymer | 700 | 700 | 300 | 110 |
| 2 | ...do... | 700 | 500 | 400 | 200 |
| 3 | ...do... | 700 | 500 | 500 | 200 |

Table I—A*

| Per cent | Conventional antioxidants | Heat seal strength | | | |
|---|---|---|---|---|---|
| | | Original | 7 days | 14 days | 21 days |
| 1 | o-Aminodiphenyl | 700 | 20 | 10 | 10 |
| 2 | ...do... | 700 | 30 | 10 | 10 |
| 1 | Catechol | 700 | 310 | 35 | 20 |
| 2 | ...do... | 700 | 395 | 90 | 40 |
| 1 | Hydroquinone | 700 | 60 | 35 | 10 |

* Believing at first that stabilization was a mere matter of preventing oxidation, the best rubber antioxidants were added to the cyclized rubber in an effort to stabilize it. The results so obtained, which show the incorrectness of this assumption, are given for purposes of contrast.

The compositions tested consisted of 10 parts paraffin wax, 90 parts cyclized rubber [1] and addition material (the percent of which, based on the amount of paraffin wax plus cyclized rubber, is set out in the tabulation). The heat sealed regenerated cellulose test strips were aged at 95° F. (35° C.) for the time set out in the tabulation at the tops of the columns of heat seal strengths.

[1] The cyclized rubber used was the non-homogeneous material obtained by drowning the reaction mass obtained by condensing rubber with a catalyst of the tin tetrachloride type before the initial exothermic preparation reaction had subsided. It had a deformation point of 30° C. Specific details of its preparation, structure, etc., are set forth in Paper Trade Journal, page 96, February 23, 1939, Rubber Age, April 1939, and J. I. E. C. XIX 1033, XXVI 125 and XXXIII 389.

Table II

| Per cent | Amino polymer stabilizer | Heat seal strength | | | | | | |
|---|---|---|---|---|---|---|---|---|
| | | Original | Days of aging | | | | | |
| | | | 7 | 14 | 21 | 28 | 35 | 42 |
| | None (control) | 200 | 50 | 20 | 15 | 10 | 10 | 10 |
| 2 | Dimethyl amino ethyl methacrylate polymer | 200 | 180 | 180 | 180 | 180 | 150 | 140 |
| 3 | ...do... | 200 | 200 | 180 | 180 | 180 | | |
| 5 | ...do... | 200 | 200 | 200 | 200 | 200 | 200 | 200 |
| 3 | Diethyl amino ethyl methacrylate polymer | 200 | 180 | 140 | 140 | | | 75 |
| 5 | ...do... | 200 | 200 | 200 | 200 | 190 | 170 | 140 |
| 3 | Dicyclohexyl amino ethyl methacrylate polymer | 200 | 200 | 200 | 170 | 100 | 100 | 70 |
| 2 | Phenol-formaldehyde-methyl-amine resin | 200 | 170 | 140 | 140 | 140 | 140 | 130 |
| 3 | ...do... | 200 | 170 | 170 | 160 | 160 | 160 | 165 |
| 5 | ...do... | 200 | 200 | 200 | 200 | 200 | | |
| 2 | Diphenyl guanidine-formaldehyde resin | 200 | 170 | 170 | 170 | 170 | 170 | 165 |
| 2 | Phenol-formaldehyde-piperazine resin | 200 | 175 | 160 | 160 | 150 | 150 | |
| 3 | ...do... | 200 | 185 | 185 | 180 | 180 | 180 | |
| 5 | ...do... | 200 | 195 | 190 | 190 | 190 | 190 | |
| 3 | Triethanolamine phthalate resin | 200 | 165 | 165 | 155 | 155 | 140 | 135 |
| 3 | Dimethyl amino ethyl methacrylate monomer * | 200 | 65 | 20 | 10 | 10 | 10 | 10 |
| 5 | ...do *... | 200 | 95 | 30 | 10 | 10 | 10 | 10 |

* The effect of the monomeric amino bodies is included for purposes of comparison.

The compositions tested consisted of 10 parts paraffin wax, 90 parts cyclized rubber [2] and the addition materials set out in the tabulation. The heat sealed regenerated cellulose test strips were aged at 95° F. (35° C.) for the time indicated.

*Table III*

| Per cent | Amino polymer stabilizer | Hours of aging | | | | | |
|---|---|---|---|---|---|---|---|
| | | Original | Sun lamp hours | | | | |
| | | | 4 | 8 | 12 | 16 | 20 |
| | None (control) | 200 | 15 | 10 | | | |
| 2 | Dimethyl amino ethyl methacrylate polymer | 200 | 145 | 110 | 100 | 60 | 35 |
| 3 | do | 200 | 145 | 130 | 130 | 75 | 50 |
| 5 | do | 200 | 190 | 185 | 175 | 105 | 60 |
| 3 | Diethyl amino ethyl methacrylate polymer | 200 | 130 | 35 | 10 | | |
| 2 | Phenol-formaldehyde methylamine resin | 200 | 130 | 125 | 65 | 50 | 15 |
| 3 | do | 200 | 140 | 140 | 80 | 70 | 15 |
| 5 | do | 200 | 135 | 135 | 80 | 85 | 15 |
| 2 | Diphenyl guanidine-formaldehyde resin | 200 | 100 | 100 | 70 | 65 | |
| 3 | do | 200 | 125 | 105 | 80 | 60 | 60 |
| 5 | do | 200 | 160 | 120 | 120 | 65 | 65 |
| 3 | Phenol-formaldehyde-piperazine resin | 200 | 145 | 100 | | 15 | 15 |
| 5 | do | 200 | 135 | 130 | | 45 | 50 |
| 5 | Dimethyl amino ethyl methacrylate monomer * | 200 | 15 | 10 | | | |

* The effect of a monomeric amino body is included for purposes of comparison.

The compositions tested consisted of 10 parts paraffin wax, 90 parts cyclized rubber [3] and the addition materials set out in the tabulation. The regenerated cellulose test strips were exposed to a standard sun lamp for the time set out in the tabulation.

*Table IV*

| Amino polymer stabilizer | Heat seal strength | | | | |
|---|---|---|---|---|---|
| | Original | Days of aging | | | |
| | | 21 | 28 | 35 | 42 |
| None (control) | 200 | 115 | 105 | 60 | 40 |
| Dimethyl amino ethyl methacrylate polymer | 200 | 150 | 150 | 150 | 150 |
| Phenol-formaldehyde-methylamine resin | 200 | 150 | 150 | 150 | 150 |
| Diphenyl guanidine-formaldehyde resin | 200 | 160 | 160 | 120 | 110 |
| Phenol-formaldehyde piperazine resin | 200 | 200 | 200 | 200 | 190 |

The compositions tested consisted of 10 parts paraffin wax, 90 parts Marbon B [4] and 3 parts of addition material. The heat sealed regenerated cellulose test strips were aged at 95° F. (35° C.) for the time set out in the tabulation.

*Example I*

Prepare a moistureproofing coating composition (lacquer) by dissolving a mixture of 90 parts Pliolite (milled material softening at 30° C.), 10 parts paraffin wax (M. P. 60° C.) and 1 part dimethyl amino ethyl methacrylate polymer, in toluene. Pass a sheet of regenerated cellulose approximately 0.00088 inch thick through a bath of this composition, remove the excess solution from the surface by means of doctor knives, and introduce the coated sheet into a drier through which air is circulating. In this drier raise the temperature of the sheet material rapidly, and dry the coating at a temperature approximately equal to the melting point of the wax. The material so produced will be highly transparent, flexible, and moistureproof, and exhibit no degradation of moistureproofness or heat seal properties after a period of 7 days from the time of coating.

*Example II*

Apply a moistureproofing coating composition consisting of:

| | Parts |
|---|---|
| Pliolite (softening point 30° C.) | 90 |
| Paraffin wax (M. P. 60° C.) | 10 |
| Dimethyl amino ethyl methacrylate polymer | 3 | to a regenerated cellulose sheet in the manner described in Example I. Any organic solvent which will dissolve the cyclized rubber and amino polymer, particularly the hydrocarbon solvents such as benzene, may be used in the coating process. Mixed solvents, such as those containing in addition to the above minor proportions of ketones, esters, alcohols, etc., are frequently used. A product so produced will be highly transparent, moistureproof, and exhibit good heat seal with no degration in these properties after the elapse of a considerable period of time.

*Example III*

Apply a composition consisting of:

| | Parts |
|---|---|
| Pliolite (homogenized, softening point 30° C.) | 90 |
| Paraffin wax (M. P. 60° C.) | 10 |
| Dimethyl amino ethyl methacrylate polymer | 5 | to a sheet of regenerated cellulose in the manner described in Example I. Moistureproofed sheets so produced exhibit good heat seal with no degradation thereof over a period of six weeks from the time of coating.

*Example IV*

Apply a composition consisting of:

| | Parts |
|---|---|
| Pliolite (homogenized, softening point 30° C.) | 90 |
| Paraffin wax (M. P. 60° C.) | 10 |
| Diethyl amino ethyl methacrylate polymer | 3 | to a sheet of regenerated cellulose as described in Example I. The product so produced will be highly transparent, flexible and moisture-proof, and shows no degradation in these properties for a period of at least six weeks. In addition, after

---

[2] The cyclized rubber used was the product resulting from milling the non-homogeneous material obtained by drowning the reaction mass before the initial exothermic preparation reaction had subsided. It had a deformation point of 30° C.

[3] The homogenized product having a softening point of 30° C., described in Table II.

[4] Practically pure cyclized rubber containing no chlorine or other impurity other than those normally present in rubber, and having a softening point of 50° C.

a two weeks' interval the coating will remain firmly adhesive upon and to the base sheet, and will not be loosened by immersion in water for a period of over one hour. The coated sheet, after 14 days aging at 95° C., will still have its original permeability value of 10.

*Example V*

Apply a composition consisting of:

| | Parts |
|---|---|
| Pliolite (milled, softening point 30° C.) | 90 |
| Paraffin wax (M. P. 60° C.) | 10 |
| Diethyl amino ethyl methacrylate polymer | 5 | to a sheet of regenerated cellulose as described in Example I. Corresponding excellent results will be obtained.

*Example VI*

Apply a composition consisting of:

| | Parts |
|---|---|
| Pliolite (milled, softening point 30° C.) | 90 |
| Paraffin wax (M. P. 60° C.) | 10 |
| Phenol formaldehyde methyl amine resin | 5 | to a sheet of regenerated cellulose, as described in Example I. Similar excellent results will be obtained.

*Example VII*

Dissolve a composition consisting of:

| | Parts |
|---|---|
| Pliolite (milled, softening point 30° C.) | 90 |
| Paraffin wax (M. P. 60° C.) | 10 |
| Diphenyl guanidine formaldehyde resin | 2 | in toluene, and apply it to a regenerated cellulose sheet as described in Example I. Similar excellent results will be obtained.

*Example VIII*

Dissolve a composition consisting of:

| | Parts |
|---|---|
| Pliolite (milled, softening point 30° C.) | 90 |
| Paraffin wax (M. P. 60° C.) | 10 |
| Phenol formaldehyde piperazine resin | 3 | in benzene and apply it to a regenerated cellulose sheet, as described in Example I. Similar excellent results will be obtained.

*Example IX*

Apply a composition consisting of:

| | Parts |
|---|---|
| Pliolite (milled, deformation point 30° C.) | 90 |
| Paraffin wax (M. P. 60° C.) | 10 |
| Triethanol amine phthalate resin | 3 | to a sheet of regenerated cellulose, in the manner described in Example I. Similar results will be obtained.

*Example X*

Dissolve a composition consisting of:

| | Parts |
|---|---|
| Marbon B (softening point 50° C.) | 90 |
| Paraffin wax (M. P. 60° C.) | 10 |
| Dimethyl amino ethyl methacrylate polymer | 3 | in toluene, and apply it to a sheet of regenerated cellulose as described in Example I. Similar excellent results will be obtained.

*Example XI*

Dissolve a composition consisting of:

| | Parts |
|---|---|
| Marbon B (softening point 50° C.) | 90 |
| Paraffin wax (M. P. 60° C.) | 10 |
| Phenol formaldehyde methyl amine resin | 3 | in toluene, and apply it to a sheet of regenerated cellulose as described in Example I. Similar excellent results will be obtained.

*Example XII*

Dissolve a composition consisting of:

| | Parts |
|---|---|
| Marbon B (softening point 50° C.) | 90 |
| Paraffin wax (M. P. 60° C.) | 10 |
| Diphenyl guanidine formaldehyde resin | 3 | in toluene, and apply it to a sheet of regenerated cellulose as described in Example I. Similar excellent results will be obtained.

*Example XIII*

Dissolve a composition consisting of:

| | Parts |
|---|---|
| Marbon B (softening point 50° C.) | 90 |
| Paraffin wax (M. P. 60° C.) | 10 |
| Phenol formaldehyde piperazine resin | 3 | in toluene, and apply it to a sheet of regenerated cellulose, as described in Example I. Similar results will be obtained.

*Example XIV*

Dissolve a composition comprising essentially:

| | Parts |
|---|---|
| Pliolite (deformation point 65° C.) | 90 |
| Hydrogenated methyl abietate | 10 |
| Dimethyl amino ethyl methacrylate polymer | 3 | in toluene, and apply it to a surface of regenerated cellulose film. The coated film, although not moistureproof, will be highly flexible and transparent and exhibit good heat seal bond strength for long periods of time.

*Example XV*

Dissolve a highly moistureproof adhesive composition consisting of:

| | Parts |
|---|---|
| Cyclized rubber (Pliolite having a softening point of 30° C.) | 50 |
| Hydrogenated methyl abietate | 30 |
| Paraffin wax (M. P. 60° C.) | 20 |
| Dicyclohexylaminoethyl methacrylate polymer | 10 | in benzene (or toluene), apply the resultant to a surface, and allow the solvent to evaporate.

The aforementioned cyclized rubber is a thermoplastic resin-like material, less unsaturated than rubber, obtained when a very high grade of low protein content rubber is made into a heavy viscous non-drying cement with benzene, and refluxed with a catalyst such as stannic chloride (U. S. A. Patent No. 2,050,209 to Gehman; also U. S. A. Patents 1,797,188, 1,846,247, 1,853,334 and 2,052,931). It appears to be a condensation derivative of rubber, having the structural formula:

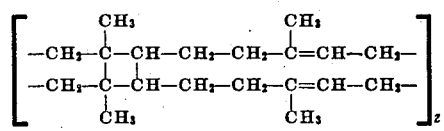

$z$ being a large whole number somewhat smaller than the number of isoprene units in rubber. It has the empirical formula $(C_5H_8)_y$. Minor variations in composition and certain properties (distortion point, solution viscosity) of the cyclized rubber, obtained principally by varying the time of reaction, result in a family of resins offered in commerce under the trade names Pliolite, Plioform, Marbon, etc.

Cyclized rubber may be prepared by condensing rubber in any one of several different ways. The term "condensation" is used in the same sense that it is employed by Cohen (page 245 of his "Organic Chemistry for Advanced Students," 1909 Edition), namely:

"Condensation may, then be defined as the union of two or more organic molecules or parts of the same molecule with or without elimination of component elements, in which the new combination is effected between carbon atoms."

In the condensation, various reagents may be employed for converting rubber into the rubber derivative. In one mode of preparation, a solution (the reaction with the rubber is advantageously carried out in solution) of the rubber in benzene is boiled for an hour or two and then, while continuing the boiling under reflux condenser, up to 10% (based on the amount of rubber) of a conversion agent such as stannic chloride, is added. The heating is then continued for perhaps several hours, until the desired reaction has taken place. The condensation derivative of the rubber is isolated by pouring the reaction mass into water, acetone, alcohol (methyl, ethyl, etc.) and the like.

Tin tetrachloride apparently reacts with the rubber to form a tin chloride addition product of rubber (or cyclized rubber) which probably has the formula $(C_5H_8)_x \cdot SnCl_4$. The tin and chlorine split off upon drowning the reaction product, leaving the cyclized rubber hydrocarbon. In this procedure aluminum chloride, ferric chloride, chromic chloride or another halide of an amphoteric metal, may replace the tin chloride.

Condensation derivatives containing a small amount of combined chlorine are obtained when a rubber cement is treated with chlorostannic acid or a mixture of hydrochloric acid and a compound such as tin tetrachloride. It is not necessary to preboil the cement before treatment if the rubber conversion agent employed is of this sort. In this type of reaction, rubber, milled to a plasticity of about 300, is dissolved in sufficient benzene to form a 10% solution, and to the resultant 10% (based on the weight of the rubber) of crystalline chlorostannic acid is added. The reaction mixture is then heated to boiling under a reflux condenser maintained at or near the boiling point until the desired reaction has taken place.

To isolate the cyclized rubber the reaction mixture is filtered and poured with agitation into sufficient water to form an emulsion in which the solution of the reaction product forms the discontinuous phase. It is advantageous to add a reducing agent such as sodium sulfite to the water to prevent or minimize the oxidation. The emulsion is steam distilled to remove the benzene, with the result that the condensation derivative precipitates as a fine powder.

For some uses, such as the cementing agent in a lacquer, it is advantageous to mill the powder to a homogeneous mass before compounding it with the other ingredients in the present invention but the unmilled product can be used.

The deformation point (point at which plastic flow is detectable) of the condensation derivative depends (apparently) upon the extent to which the treatment continues after the initial reaction surge (the reaction or treatment being stopped by drowning the reaction mass), and the temperatures involved. The reaction at the beginning is highly exothermic, and the practical lower deformation point (sometimes confused with "softening point") is about 30° C. A deformation point of about 105° C. is obtainable with a long reaction time. Products having the lower deformation points are usually obtainable commercially in the non-homogeneous form which results from drowning the reaction mixture and in the uniform condition obtained by milling the non-uniform product. The milled products are generally the more stable of the two and are more uniformly soluble. The distinction between the two types of materials progressively disappears as the deformation point is raised.

Condensation derivatives (cyclized rubber) with a softening point from 50° to 140° C. are, in general, satisfactory for use in moistureproofing adhesives, moistureproofing lacquers, and the like. A product with a softening point around 70° C. is ordinarily employed. Obviously, the most satisfactory softening point for any particular use depends upon the nature of the use.

The amino-nitrogen-containing polymers capable of being formed into coherent films, soluble in organic solvents and in 2% aqueous acetic acid and insoluble in water can, for convenience, be divided into sub-groups, as follows:

(A) Resinous, polymeric, coherent-film-forming reaction products of phenols, aldehydes and material from the group consisting of ammonia, primary amines and secondary amines;

(B) Resinous, coherent-film-forming amino alcohol esters of material from the group consisting of acrylic acid and acrylic acid substituted in the alpha position by a hydrocarbon radical;

(C) Resinous, polymeric, coherent-film-forming reaction products of amino phenols with aldehydes;

(D) Resinous, polymeric, coherent-film-forming reaction products of alphyl ketones (aliphatic and alicyclic) with formaldehyde and material from the group consisting of ammonia, primary amines, secondary amines and tertiary amines;

(E) Resinous, polymeric, coherent-film-forming reaction products of diaryl (especially diphenyl) guanidine with aldehydes (especially formaldehyde);

(F) Resinous, polymeric, coherent-film-forming reaction products of diaryl (especially diphenyl) guanidine with aldehydes (especially formaldehyde) and amines (primary or secondary);

(G) Resinous, polymeric, coherent-film-forming amino alcohol esters of polycarboxylic acids;

(H) Resinous, polymeric, coherent-film-forming aromatic amine aldehyde resins;

(I) Resinous, polymeric, coherent-film-forming reaction products of vinyl ketone polymers with material from the group consisting of ammonia and amines;

(J) Resinous, polymeric, coherent-film-forming reaction products of piperazine, aldehydes (especially formaldehyde) and phenols;

(K) Resinous, polymeric, coherent-film-forming reaction products of dimethylol urea dimethyl ether and amines;

(L) Resinous, polymeric, coherent-film-forming reaction products prepared by treating polyvinyl chloroacetate with secondary aliphatic amines;

(M) Resinous, polymeric, coherent-film-forming products resulting from the raction of urea, formaldehyde, and lower aliphatic (in which the substituent radicals have less than 5 carbon atoms) primary or secondary amines (especially methyl, dimethyl, butyl and dibutyl amines);

(N) Resinous, polymeric, coherent-film-forming products obtained by polymerizing, in the presence of catalytic proportions of stannic chloride, the reaction product of epichlorohydrin, with material from the group consisting of ammonia and primary aliphatic amines;

(O) Resinous, polymeric, coherent-film-forming reaction products of phenol-lignin with dimethyl amine and formaldehyde;

(P) Resinous, polymeric, coherent-film-forming products obtained by the catalytic hydrogenation of resins having ketone groups at superatmospheric temperature and pressure in the presence of material from the group consisting of ammonia, primary amines and secondary amines; and (Q) Resinous, polymeric coherent-film-forming reaction products of protein material from the group consisting of lower aliphatic aldehydes and lower aliphatic ketones and amines having less than 9 carbon atoms, in which the amino nitrogen is joined to the aliphatic carbon.

These related highly polymeric amino nitrogen-containing substances, which are prepared synthetically, form a distinctive group. Since the corresponding monomers do not accomplish the end desired, it is clear that their effectiveness is dependent upon polymeric form.

Details of the preparation of these basic amino nitrogen-containing polymers are summarized below.

In general, the products of group A are prepared by reacting an aldehyde (preferably formaldehyde) with the appropriate nitrogen compound (ammonia or amine) in aqueous solution to give a methylol derivative (of the ammonia or amine), which is then reacted with the phenol in question. The resin separates from the solution as it is formed, and is usually washed with water before drying. The detailed preparation of these resins is disclosed in the patent literature, see for example, U. S. A. Patent No. 2,098,869 (Harmon and Meigs), particularly Examples A-1, A-7 and A-8, U. S. A. Patent No. 2,168,335 (Heckert), particularly Example A-6, U. S. A. Patent No. 2,168,336 (Heckert), particularly Example A-2, U. S. A. Patent No. 2,031,517 (Bruson) and U. S. A. Patent No. 2,053,092 (Bruson). The preferred combinations are the reaction products of:

(1) Phenol___mols__ 1
    Formaldehyde___do____ 2
    Methylamine___do____ 1

(2) Phenol___mols__ 0.5
    Formaldehyde___do____ 1.4
    Dimethylamine___do____ 0.4
    Ammonia___do____ 0.5

(3) Phenol___mols__ 1
    Formaldehyde___do____ 2
    Piperazine___do____ 1

(4) Beta-naphthol___mols__ 1
    Formaldehyde___do____ 2
    Methylamine___do____ 1

(5) Phenol___mols__ 1
    Formaldehyde___do____ 2
    N-aminoethyl morpholine___do____ 1

(6) Phenol___mols__ 1
    Formaldehyde___do____ 2
    Ammonia___do____ 1

(7) Phenol___mols__ 1
    Formaldehyde___do____ 2
    Ethylene-diamine___do____ 1

(8) Resorcinol___mols__ 1
    Formaldehyde___do____ 1
    Methylamine___do____ 0.5

(9) Diphenylolpropane___mols__ 1
    Formaldehyde___do____ 4
    Dimethylamine___do____ 2

(10) Xylenol___mols__ 1
     Formaldehyde___do____ 1.8
     Diethanolamine___do____ 0.6

In general, the polymeric amino nitrogen-containing bodies of group B are prepared by reacting the appropriate amino alcohol with the methyl ester of the acrylic (or alpha-substituted homolog, preferably methacrylic) acid, distilling off the methanol (thereby forming the monomeric amino alcohol acrylate or homolog), and polymerizing (by any suitable means, such as heat, light or peroxide catalyst). The preparation of polymeric esters of this type are disclosed in detail in U. S. A. Patent No. 2,138,763 (Graves). The polymerization procedures described in U. S. A. Patent No. 2,138,762 (Harmon) are quite suitable. The preferred esters include poly-(beta-dimethylaminoethyl - methacrylate) poly-(beta-dimethylaminoethyl-methacrylate), poly-4-(beta-methacrylyloxyethyl)-morpholine, poly-(beta - dicyclohexylaminoethyl - methacrylate), triethanol-amine-monomethacrylate, and the like.

Preparation of the resins falling in category C is described in detail in U. S. A. Patent No. 2,147,789 (Graves). The preferred product of this group is that obtained by reacting meta-diethylamino-phenol with formaldehyde.

The resinous products of group D are, in general, prepared in the same manner as the preferred material which is the reaction product of acetone, formaldehyde and methylamine. To prepare this material, a solution of 5 parts of trisodium phosphate (Na₃PO₄·12H₂O) in 50 parts of water wax mixed with 50 parts paraformaldehyde. The mixture was cooled in ice, and a solution containing 19 parts (0.61 mol) of methylamine dissolved in 50 parts of acetone, added. A vigorous reaction set in, and cooling was necessary. After the initial reaction was over, the mixture was heated on a steam bath over a reflux condenser for 1¾ hours. It was then allowed to stand overnight. A soft brown, resinous mass resulted. This was well mixed with water to remove unreacted materials, separted from the water and dried. The final product was an amorphous, orange-colored solid soluble in glacial acetic acid and not precipitated upon dilution of this solution with water. The resin was partially soluble in alcohol, chloroform and dioxan, and was insoluble in acetone, ethyl acetate and toluene.

The resinous products of group E are, in general, prepared in the same manner as the preferred material which is the reaction product of diphenyl guanidine with formaldehyde. To prepare this material, 43 parts (0.2 mol) of diphenyl guanidine was mixed with 48.6 parts (0.6 mol) of 37% formaldehyde solution, and the mixture allowed to stand with occasional stirring for 18 hours at a temperature of 50° C. The mixture set to a sticky, taffy-like mass which became progressively harder and more brittle. After 18 hours, the resinous mass was ground under cold water, filtered, washed with water and air dried. The final product was a white, amorphous powder soluble in dilute (2%) acetic acid and toluene.

The polymeric basic amino nitrogen-containing bodies of group F are, in general, prepared in the same manner as the preferred material which is the reaction product of diphenyl guanidine, formaldehyde and methylamine. To prepare this material, a solution of dimethylol methylamine (1 mol) in water was made by passing 31 parts (1 mol) of methylamine into 160 parts (2 mols) of 37% formaldehyde solution cooled with ice. The solution was added to 215 parts (1 mol) of diphenyl guanidine, and the mixture stirred for 15 minutes. This gave a dough-like product which was allowed to stand for 22 hours to complete the reaction. At the end of this time the mixture became a hard, resinous mass. It was ground under cold water, filtered, washed with water, and dried over calcium chloride in a vacuum desiccator. The reaction product was a white powder soluble in acetone, ethyl acetate, chloroform, dioxan and toluene.

The resinous products of group G are, in general, prepared in the same manner as the preferred material which is the reaction product of triethanol amine and dimethyl phthalate. To prepare this material, a mixture of 149 parts (1 mol) of triethanol amine, 194 parts (1 mol) of dimethyl phthalate and 800 parts of benzene was charged into a reaction flask, and a solution of 2 parts of sodium in 16 parts of methanol was added in small proportions during the course of the reaction as a catalyst. The mixture was heated at a temperature of 130°-155° C. for 9 hours. During this time a binary of methanol and benzene distilled off. When the theoretical amount of binary had been collected in the receiver, the reaction was stopped and the benzene distilled off on a steam bath under reduced pressure. The residue was a viscous oil which, upon cooling, became a soft, resinous mass. The resinous product was soluble in 20% acetic acid, and films flowed from this solution became hard and brittle on baking at 110° C. for 10 hours. The resinous reaction product was soluble in dioxan. 90% ethyl alcohol, 90% acetone and chloroform, and was partly soluble in toluene.

Preparation of the resins falling in category H is described in detail in British Patent 342,325. The preferred reaction product in this group is that from aniline and formaldehyde.

Synthetic resins falling in class I are generally prepared by reacting polymeric vinyl ketones with ammonia or primary amines. The conditions of the reaction and the products are described in detail in U. S. A. Patent 2,122,707 (Balthis).

The resinous products of group J are, in general, prepared in the same manner as the preferred material which is the reaction product of formaldehyde, piperazine and phenol. To prepare this material, 162 parts (2 mols) of aqueous 37% formaldehyde was cooled to 15° C., and 190 parts (1 mol) of piperazine hexahydrate in 200 parts of water added drop-wise at such a rate that the temperature did not rise above 23° C. The reaction vessel was cooled in ice, then 94 parts (1 mol) of phenol in 20 parts of water was added all at once and the ice bath removed. The reaction vessel was then raised to a temperature of 35° C. and allowed to stand over night. A light pink, sticky resin, which was washed with water, was obtained.

The polymeric substances of group K are, in general, prepared in the same manner as the preferred materials which are the reaction products of dimethylol urea dimethyl ether with n-butyl-diethanol amine and with hexamethylenediamine.

To prepare the first of these materials, 80.5 parts of n-butyl-diethanol amine and 74 parts of dimethylol urea dimethyl ether were mixed and heated in an atmosphere of nitrogen in a bath maintained at 150°-160° C. for 1.5 hours. Methanol (28 parts) was evolved during this time, and a clear, light-yellow resin, soluble in dioxan, trichlorethylene, dilute aqueous acetic acid and hydrochloric acid, was formed.

To prepare the second of these products, 29 parts of hexamethylene diamine and 37 parts of dimethylol urea dimethyl ether were mixed and gently heated in a distilling vessel in an oil bath until 7 parts of methanol had distilled. The resinous residue in the distilling vessel was washed with water, dissolved in concentrated hydrochloric acid, and precipitated with aqueous sodium hydroxide. The precipitate was filtered, washed with water and dried. A white amorphous powder, which was soluble in butanol and dilute aqueous acetic acid, was obtained.

The resinous products of group L are prepared, for example, by dissolving 15 parts of di-n-butyl-amine and 10 parts of polymeric vinyl-alpha-chloroacetate in 80 parts of ethylene glycol-monomethyl ether, allowing the solution to stand in a closed vessel for 2 weeks, pouring into 350 parts of water, filtering off the resin which separates, and drying it. The product prepared in the manner just described is an orange-colored rubbery mass soluble in acetone, ethanol and toluene, and in 2% aqueous acetic acid. About 13 parts are obtained by this procedure.

The resinous products of group M may be prepared by dissolving two molecular proportions of urea in three molecular proportions of 37% aqueous formaldehyde, adding one molecular proportion of dimethyl (or other alkyl) amino-methanol dissolved in water (40 parts per mol of compound), and heating for about 13 hours. Evaporation of water leaves a white basic resin.

The resinous products of group N are prepared by the procedures described in U. S. A Patent No. 1,977,251.

The resinous products of group O are prepared by the process of Example B of U. S. A. Patent No. 2,122,433.

The coherent-film-forming resinous products of group P are, in general, prepared in the same manner as the preferred individual polymers whose properties and mode of preparation are described in U. S. A. Patent No. 2,063,153 (Greenewalt).

The amine polymers of group Q are, in general, prepared in the same manner as the preferred species whose properties and mode of preparation are disclosed in U. S. A. Patent No. 2,143,023 (Meigs).

Instead of simple polymers, interpolymers may be prepared, for instance, by reacting methyl methacrylate and methyl vinyl ketone in the presence of ammonium hydroxide or reacting beta-di-cyclohexylaminoethyl methacrylate monomer and beta-dimethylaminoethyl methacrylate monomer together under suitable conditions, or reacting dicyclohexylaminoethyl methacrylate with methyl vinyl ketone under suitable conditions. Other equivalent polymeric materials, such as copolymers, may also be used, provided their solubility characteristics are as previously set forth.

The two classes of basic amino-nitrogen-containing polymers which have given the most satisfactory results are the polymeric amino-alcohol esters of alpha-substituted acrylic acids described in U. S. A. Patents 2,138,762 (Harmon) and 2,138,763 (Graves), and the resins obtained by reacting phenols, formaldehyde and amines described in U. S. A. Patent 2,098,869 (Harmon and Meigs).

The latter products, which are dilute acetic acid soluble resins, and with which may be classed the very satisfactory phenol formaldehyde piperazine resins, are obtained by reacting a phenol containing carbon, hydrogen and oxygen only, and having at least 2 unsubstituted nuclear positions ortho or para to the phenolic hydroxyl with formaldehyde and a non-aromatic primary amine containing less than 7 carbon atoms. A molecular ratio of amine to phenol of not less than 0.5:1 and not greater than 1:1, and a molecular ratio of aldehyde to amine not greater than 1:1 in this reaction, give especially desirable results.

The specific compounds which are preferred for the purposes of this invention are beta-di-n-butylaminoethyl methacrylate polymer; 2-amino-cyclohexyl methacrylate polymer; triethanolamine mono-methacrylate polymer; 2-(diethyl-amino)-cyclohexyl methacrylate polymer; 4-(beta-methacrylyloxyethyl)morpholine polymer; beta-dimethylaminoethyl methacrylate polymer; beta-diethylaminoethyl acrylate polymer; beta-dicyclohexylaminoethyl acrylate polymer; 1-(beta - methacrylyloxyethyl) piperidine polymer; the resin obtained by the hydrogenation, in the presence of ammonia, of polymerized bis-(4-keto-cyclohexyl)dimethylmethane; the resin obtained from the hydrogenation, in the presence of ammonia, of polymerized methylvinyl ketone; the reaction product of polymeric methyl alpha-methylvinyl ketone and cyclohexylamine; the reaction products of polymeric methylvinyl ketone and aqueous ammonia (or cyclohexylamine, ethylenediamine, hexamethylenediamine, and the like); the resin obtained by reacting cyclohexanone with formaldehyde and methylamine; the resinous reaction product of acetone with formaldehyde and butylamine; and phenol-formaldehyde-hydrazine resin, cresol-formaldehyde-tetraethylenepentamine resin, phenol-formaldehyde-ethylenediamine resin, phenol - formaldehyde-dodecyl amine resin, phenol-formaldehyde-thiourea resin and cresol-formaldehyde-melamine resin.

The choice of amino polymer to be used depends partly upon the solubility of the polymer, partly on the compatibility of the polymer with the cyclized rubber in solution, and partly on the special requirements of the specific moisture-resistant composition being manufactured, such as softening point, etc. In general, basic resins soluble in toluene or gasoline, compatible with cyclized rubber in solution and capable of imparting the longest posible storage life to the cyclized rubber after the application, are preferred. One criterion of stabilizing power is the basicity of the resin as judged by the per cent of amino nitrogen in the molecule. Usually the higher the percentage of amino nitrogen, the longer will be the stabilizing power of the polymer.

The polymeric basic amino nitrogen-containing substance may be introduced into the cyclized rubber, and compositions containing the same, in any desired manner. Ordinarily the incorporation is made by the use of a mutual solvent or by milling, but grinding, kneading, and other conventional mixing procedures are satisfactory.

The stabilizing effect of the amino polymer is roughly proportional to the amount used with the cyclized rubber. The practical limits are from 0.005 to 1.0 part (0.5%–50%) of amino polymer per part of cyclized rubber product. Improvement obtained by using amounts of amino polymer below the aforementioned lower limit is detachable, but not great enough to be of practical value, and no advantage seems to be afforded by using proportions greater than the aforementioned upper limit. Preferably 3%–15% is employed.

As the moistureproofing agent, any wax (used generically to include waxy or wax-like substances like paraffin wax, as well as true waxes which are monohydric alcohol esters of higher fatty acids) or mixture of waxes, may be employed. Ordinarily paraffin wax melting above 50° C., or better, that melting at 60° C. (and above) is preferred.

The new cementing agent compositions are especially useful in coating compositions applied to transparent, smooth, substantially non-porous, non-fibrous sheet, such as those composed of cellulosic material, for example, regenerated cellulose (Cellophane), ethyl cellulose and cellulose acetate; albuminous material, for example, gelatin and casein; and polyvinyl compounds, for example, polyvinyl alcohols and polyvinyl acetals. Water sensitive sheet obtained by coagulation or precipitation and/or regeneration from aqueous (or aqueous alkaline, for example, alkali metal hydroxide and the like) dispersions (or solutions), for example, viscose, cuprammonium and like regenerated cellulose, polyvinyl alcohol, low (lowly) substituted (less than one mol per glucose unit) cellulose ethers (U. S. A. Patent 2,123,880 to Ellsworth), such as glycol cellulose, cellulose glycolic acid, alkyl (methyl, ethyl, etc.) cellulose, and the like, are especially satisfactorily coated with the moisture-proofing compositions of this invention.

As indicated above, the presence of the new cyclized rubber combinations or compositions also improves coating compositions used on organic solvent soluble compounds like cellulose ethers, for example, ethyl cellulose, and cellulose esters, for example, cellulose acetate. The same is true with paper, modified paper, lowly esterified cellulose, etc. The moisture-resistant coating compositions may be converted into coherent self-sustaining films having the "solids" composition set forth by procedures known to the art.

The new compounds can also be used to coat fabrics, to prepare molding materials, to act as cementing (binding) agents in protective coatings for wood, metal, etc., as adhesives, and for numerous other purposes. These compositions also serve admirably as adhesives in the lamination of sheet material, for example, regenerated cellulose, cellulose derivatives of the same or different kinds, regenerated cellulose to paper, etc., especially when a moistureproof product is desired.

In the preferred procedures, moistureproofing coatings are applied by passing the base sheet through a bath (solution) containing the coating composition but spraying a corresponding solution on the base sheet, and the other schemes known to the art, particularly that listed elsewhere herein, can be used satisfactorily.

Ordinary moistureproof sheet wrapping material consists of a regenerated cellulose film 0.00088 of an inch thick, with a moistureproofing coating 0.0005 of an inch thick on each side.

The properties of the new cyclized rubber-amino polymer coating compositions may be enhanced and modified in known ways, by the incorporation of minor proportions of other materials; for example, 0%–25% (preferably 0%–10%) plasticizer, 0%–50% (preferably 0%–25%) transparentizing agent, etc. Details of the conventional modifying practices such as dyeing, pigmenting, plasticizing (or softening), transparentizing, and like procedures and materials used therein, are well known and are disclosed in the patents and art listed elsewhere herein. Reference is made thereto for specific details. Beneficial results are frequently brought about by incorporating natural and/or synthetic resins.

Moistureproofness, moistureproofing and moistureproof materials and expressions are defined in U. S. A. Patent 2,147,180 (Ubben). In the interest of brevity the definitions are not repeated here. The terms and expressions related thereto and employed herein are used in accordance with such definitions.

Heat seal bond and heat seal bond strength are defined and a standard test for their determination is given in U. S. A. Patent 2,147,180 (Ubben). In the interest of brevity the definitions are not repeated here. The term and expressions related thereto and employed herein are used in accordance with such definitions and description.

Some discussion of the meaning and significance of the terminology or restrictions on the stabilizing materials may be desirable. The term "polymeric" implies an amorphous, high molecular weight substance usually capable of being formed into a coherent film; if the agent be polymeric, non-volatile and film-forming it is retained in the film for appreciably longer times and does not detract from the film-forming ability of the composition. By "basic" is meant an ability to form acid addition salts, and by "amino-nitrogen" is meant the nitrogen of an amino group as opposed to that of nitro, amido, nitrile, etc., groups. It is a matter of simple test to determine if the agent is basic in character and contains amino-nitrogen. In the large majority of cases, the materials from which the agent is synthesized are a definite indication whether or not it contains amino-nitrogen. It is sufficiently basic if it dissolves readily in dilute aqueous acetic acid. The qualification "organic-solvent-soluble" implies simple physical solution (i. e., without chemical reaction to an appreciable extent) in one or more types of solvents such as alcohols, hydrocarbons, ketones, esters, etc. Thus, methyl-aminophenol-formaldehyde resin, which is readily soluble in a number of solvents, is suitable for use in the invention, whereas deacetylated chitin is not, because it is insoluble in organic solvents.

Originally it was assumed that the changes in properties of the cyclized rubber and compositions based thereon resulted from an oxidizing action, particularly under conditions involving light and heat, and efforts were made to maintain such products in their initial condition by incorporating anti-oxidants therein. The slight extent of the improvement (in those cases where improvement could be detected) obtained by this scheme was discouraging. The time elapsing before loss of heat sealing properties increased less than five-fold. The results, so far as discoloration was concerned, were equally disappointing. Other undesirable features attendant upon these efforts were difficulties in the application of the compositions, objectionable lowering of the softening point of adhesive compositions, inability of the compounded material to withstand shock, etc.

Many of the advantages of the present invention are believed apparent from the foregoing part of the specification. The compositions containing cyclized rubber, and the cyclized rubber itself, are stabilized for long periods of time (if not indefinitely), extending the useful life many times over, even under conditions involving high temperatures and/or strong light.

The degree of stability resulting from the incorporation of the polymeric or resinous basic amino nitrogen-containing bodies in cyclized rubber, is much greater than can be obtained by incorporating conventional anti-oxidants. The amino polymers being film forming by nature and having thermoplastic properties, have the further advantage that they contribute to the adhesive properties of the cyclized rubber. In an actual case it has been found that a 25-fold improvement in 65° C. ageing life for cyclized rubber containing the amino polymers as compared with the unmodified cyclized rubber, was obtained. About a 5-fold improvement is all that can be expected when anti-oxidants such as those used in rubber are employed.

The cyclized rubber-amino polymer cementing agent material makes it possible to produce moistureproof products which retain their desirable properties (heat seal, color, etc.) over an unexpectedly long period of time.

The moisture-resistant compositions adhere firmly and tenaciously to the smooth glass-like surfaces such as those of regenerated cellulose and like nonfibrous sheet material over long periods of time, even in the presence of liquid water or under conditions of high relative humidity, and the characteristics of the heat seal bonds (particularly strength) are outstanding. Furthermore, by virtue of their ingredients, such coating compositions are cheaper and more economical than many of those used heretofore extensively. In addition, sheet material having good slip (surface characteristics enabling adjacent sheets in a stack to separate from each other), a desideratum in material for use on automatic machinery, are obtained. The transparency properties are good even in thick coatings.

As many apparently widely different embodiments of this invention may be made without departing from the spirit and scope thereof, it is to be understood that this invention is not limited to the specific embodiments thereof except as defined in the appended claims.

I claim:

1. A thin, flexible sheet material comprising a film of a moistureproof composition, said moistureproof composition comprising essentially 3%–50% wax and cementing material therefor, said cementing material being cyclized rubber in which is incorporated 0.5% to 50% (based on the cyclized rubber) of phenol formaldehyde piperazine resin.

2. A thin, flexible sheet material comprising a film of a moistureproof composition, said moistureproof composition comprising essentially 3%–50% wax and cementing material therefor, said cementing material being cyclized rubber in which is incorporated phenol formaldehyde piperazine resin.

3. Moistureproof sheet wrapping material consisting of regenerated cellulose sheet having a moistureproofing coating comprising essentially 10 parts wax, 3 parts phenol formaldehyde-azine resin, and 90 parts cyclized rubber.

4. Moistureproof sheet wrapping material consisting of regenerated cellulose sheet having a moistureproofing coating comprising essentially 10 parts paraffin wax, 90 parts milled cyclized rubber having a deformation point of 30° C., and phenol formaldehyde piperazine resin.

5. A method of preparing transparent moistureproof sheet wrapping material, which comprises coating a base formed of a sheet of non-fibrous and transparent cellulosic material with a composition comprising a cementing agent and a moistureproofing wax dissolved in a solvent, said cementing agent being cyclized rubber diluted with phenol formaldehyde piperazine resin, the proportions of the ingredients and the thickness of the coating being selected to produce a transparent moistureproof material, and evaporating the solvent at a temperature at least equal to the melting point of the wax in the composition.

JAMES A. MITCHELL.

CERTIFICATE OF CORRECTION.

Patent No. 2,350,366. June 6, 1944.

JAMES A. MITCHELL.

It is hereby certified that error appears in the printed specification of the above numbered patent requiring correction as follows: Page 3, second column, line 48, for "degration" read --degradation--; page 5, first column, line 7, after "then" insert a comma; page 6, first column, line 2, for "raction" read --reaction--; line 57, for "Patent No. 2,031,517" read --Patent No. 2,031,557--; and second column, line 36, for "beta-dimethylaminoethyl" read --beta-diethylaminoethyl--; page 8, first column, line 69, for "posible" read --possible--; and that the said Letters Patent should be read with this correction therein that the same may conform to the record of the case in the Patent Office.

Signed and sealed this 8th day of August, A. D. 1944.

Leslie Frazer (Seal) Acting Commissioner of Patents.